(No Model.) 2 Sheets—Sheet 1.

J. CAMERON.
HARROW.

No. 274,267. Patented Mar. 20, 1883.

Witnesses:
E. M. Johnson
Laurick Duvall

Inventor:
Joseph Cameron
By — 
Atty.

(No Model.) 2 Sheets—Sheet 2.

J. CAMERON.
HARROW.

No. 274,267. Patented Mar. 20, 1883.

UNITED STATES PATENT OFFICE.

JOSEPH CAMERON, OF CYNTHIANA, OHIO.

HARROW.

SPECIFICATION forming part of Letters Patent No. 274,267, dated March 20, 1883.

Application filed August 19, 1882. (No model.)

*To all whom it may concern:*

Be it known that I, JOSEPH CAMERON, a citizen of the United States of America, residing at Cynthiana, in the county of Pike and State of Ohio, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in harrows and means for raising and lowering the same; and it consists more especially in the construction of the harrow and elevating means, as will be hereinafter set forth, and pointed out in the claims.

Figure 1:
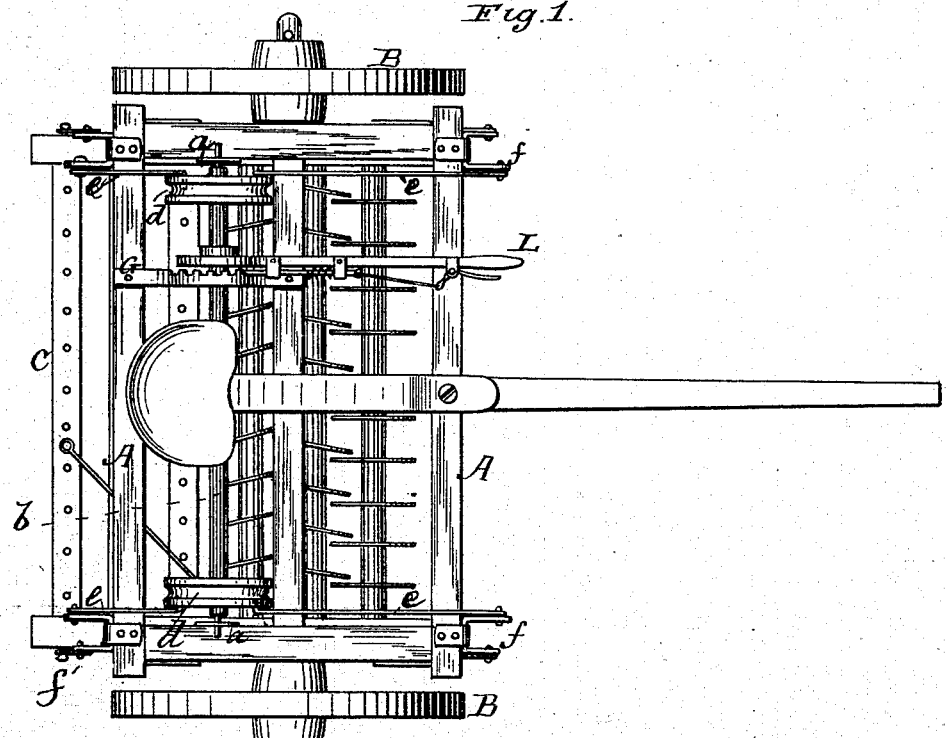
Figure 2:
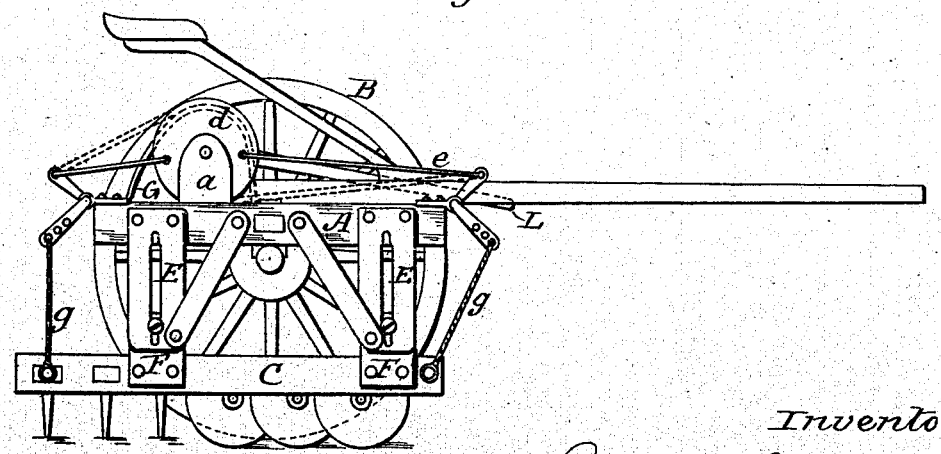
Figure 3:
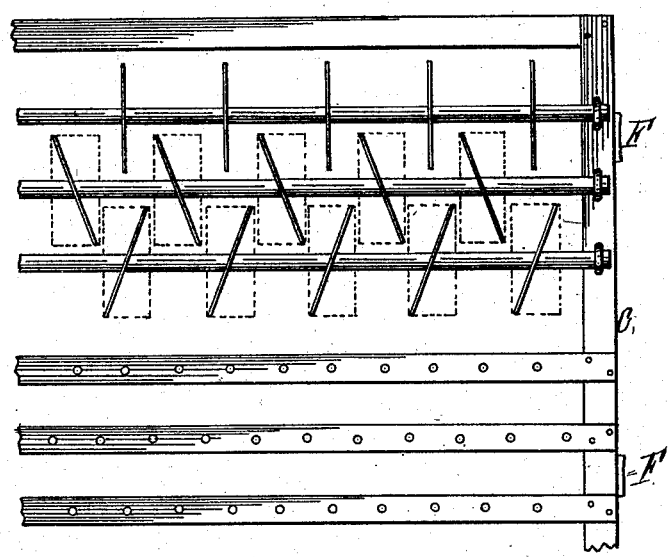

On the annexed drawings, Figure 1 is a plan view of my improved harrow. Fig. 2 is a side view of the same with one of the wheels removed; and Fig. 3 is a partial plan view of the harrow-frame, gangs of disks, &c.

On the annexed drawings, A represents the main frame, which is rectangular in shape, and is provided with suitable draft attachments, driver's seat, and axle, on which are journaled suitable supporting-wheels, B. To the frame A is also attached means for raising and lowering the harrow-frame C, as will be hereinafter set forth.

Attached to the upper part of the frame A by means of suitable raised journals, $a$, is a shaft, $b$, which extends across the frame, and is provided near its ends with pulleys $d$, to which are attached cords, as shown in dotted lines in Fig. 2, or wires $e$ for raising the harrow-frame.

To the front and rear corners of the frame A are journaled bell-cranks $f$, the lower arms of which are perforated, so that the elevating means attached to the bell-crank and harrow-frame may be adjusted.

The harrow-frame C, when raised or lowered, moves vertically in slotted guides E, which are suitably braced to the main frame. The harrow-frame C is provided with corresponding upwardly-projecting plates, F, which are provided with bolts which pass through the side guides. Cords, chains, or other flexible connecting means, $g$, are attached to the end of the harrow-frame C and to the bell-cranks $f f$, which cranks are connected by means of the cords or wires $e$ to the pulleys $d$ upon the shaft $b$, which shaft is provided with a lever, L, with a spring-catch, which catch engages with the curved retaining-plate G.

By the means hereinbefore described the harrow can be elevated to pass over obstructions or be transported on the wheels.

When the harrow is in use it will adapt itself, without being adjusted, to the unevenness of the ground. The cord or chain supporting it from the main frame, being flexible, allows the ends to rise and fall.

The harrow attachment consists of three or more series of rotary cutting disks or knives, which are set upon transverse shafts, which shafts may be journaled to the harrow-frame C. The first series of these rotary knives are set parallel to the side bars of the harrow-frame, while the knives of the series following are set at an angle on the shaft and parallel with each other. In the following series the angle at which the knives are set upon the shaft is reversed. These rotary knives are all set parallel with each other on the shafts. To the rear of the frame C are secured transverse bars with the usual harrow-teeth. By means of the rotary knives, arranged as described, the clods or sods are first cut and broken, and are further reduced in size by being thrown from side to side by the knives, which are set at an angle, as hereinbefore described. The harrow-teeth, following the knives, smooth and further pulverize the soil. By reason of the disks intermeshing with each other there is no need to provide scrapers, and the furrows which are made by the disks are laid down by the toothed section.

The side plates, E and F, on the frame hold the harrow, when raised, securely in position against lateral displacement.

What I claim as new, and desire to secure by Letters Patent, is—

1. A harrow provided with lateral series of rotary disks, the disks of the first series being set on a line with the draft and those of the following series set at angles therewith and adapted to rotate and intermesh between the disks of the adjacent series, substantially as shown and described.

2. In a cultivator or harrow provided with a frame supported on wheels and means for raising and lowering a supplemental frame, the combination of series of disks arranged upon the supplemental frame and adapted to intermesh with each other, each series being fixed upon parallel transverse shafts and at different angles with each other, substantially as shown, and for the purpose set forth.

3. In a harrow, the combination, with a frame having a rear toothed section, of transverse shafts having secured thereto series of rotary disks attached to their respective shafts at different angles with each other, substantially as shown and specified.

4. In combination with a harrow-frame, a series of transverse shafts journaled to the sides of the frame and provided with series of disks arranged at different angles with each other, so that their disks will intermesh with those of the adjacent series, substantially as shown.

In testimony whereof I affix my signature in presence of two witnesses.

JOSEPH CAMERON.

Witnesses:
W. H. SOALE,
DAVID MELSON.